United States Patent Office 2,999,845
Patented Sept. 12, 1961

2,999,845
COPOLYMER CONTAINING POLYCARBONATE AND POLYSILOXY CONSTITUENTS
Eugene P. Goldberg, Glens Falls, N.Y., assignor to General Electric Company, a corporation of New York
No Drawing. Filed Jan. 2, 1959, Ser. No. 784,431
11 Claims. (Cl. 260—47)

This invention relates to copolymer compositions having desirable physical, chemical and electrical properties and to their preparation. More particularly, it relates to copolymer compositions containing dihydric phenol derived groups.

Various types of polycarbonate resins are known, among which are those prepared by the ester interchange of carbonate esters with glycols, and by the reaction of dihydroxymonoaryl compounds such as hydroquinone and resorcinol with phosgene or carbonate esters. However, they have not generally proven useful because of chemical and physical property deficiencies.

Briefly stated, the compositions of this invention comprise essentially linear dihydric phenol derived groups linked by both carbonate and siloxy groups. Certain of the copolymers are of a random type, that is the structural units are propagated along the copolymer chain in a random fashion. Block copolymer compositions can also be prepared in which the copolymer chain is constructed from homo-polymeric linkages.

Any dihydric phenol compound is useful in the practice of this invention, such dihydric phenol being defined as a monoaryl or polyaryl phenol type material in which the hydroxyl groups are attached directly to aromatic ring carbon atoms. The dihydric phenol compounds used in connection with the invention can typically be represented by the general formula (I) 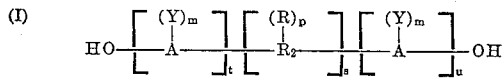

where R is hydrogen or a monovalent hydrocarbon radical, for example, alkyl radicals (e.g., methyl, ethyl, propyl, isopropyl, butyl, decyl, etc.), aryl radicals (e.g., phenyl, naphthyl, biphenyl, tolyl, xylyl, etc.), aralkyl radicals (e.g., benzyl, ethylphenyl, etc.), cycloaliphatic radicals (e.g., cyclopentyl, cyclohexyl, etc.) as well as monovalent hydrocarbon radicals containing inert substituents therein, such as halogen (chlorine, bromine, fluorine, etc.). It will be understood that where more than one R is used, they may be alike or different. $R_2$ is selected from the group consisting of an alkylene and alkylidene residue such as methylene, ethylene, propylene, propylidene, isopropylidene, butylene, butylidene, isobutylidene, amylene, isoamylene, amylidene, isoamylidene, cyclohexylidene, etc. $R_2$ can also be a silane radical or can be polyalkoxy, such as polyethoxy, polypropoxy, polythioethoxy, polybutoxy, polyphenylethoxy, etc. $R_2$ can also consist of two or more alkylene or alkylidene groups such as above, separated by an aromatic group, a tertiary amino group, an ether group, a carbonyl group, silane radical or siloxy radical, or by a sulfur-containing radical such as sulfide, sulfoxide, sulfone, etc. $R_2$ may also be a glycol dibasic acid ester residue derived from, for example, dibasic acids such as adipic, azelaic, sebacic, isophthalic, terephthalic and alkyl or aryl glycols. Other groupings which can be represented by $R_2$ will occur to those skilled in the art. A is the residue of an aromatic nucleus, Y is a substituent selected from the group consisting of (a) inorganic atoms, (b) inorganic radicals, and (c) organic radicals, (a), (b) and (c) being inert to and unaffected by the reactants and by the reaction conditions, m is a whole number including zero to a maximum equivalent to the number of replaceable nuclear hydrogens substituted on the aromatic hydrocarbon residue, p is a whole number including zero to a maximum determined by the number of replaceable hydrogens on $R_2$, s ranges from 0 to 1, t and u are whole numbers including zero. When s is zero, however, either t or u may be zero, and not both.

In the dihydric phenol compound, the substituents Y may be the same or different as may be the R. Among the substituents represented by Y are halogen (e.g., chlorine, bromine, fluorine, etc.) or oxy radicals of the formula OW, where W is a monovalent hydrocarbon radical similar to R, or monovalent hydrocarbon radicals of the type represented by R. Other inert substitutents such as a nitro group can be represented by Y. Where s is zero in Formula I, the aromatic nuclei are directly joined with no intervening alkylene or alkylidene or other bridge. The positions of the hydroxyl groups and Y on the aromatic nuclear residues A can be varied in the ortho, meta, or para positions and the groupings can be in a vicinal, asymmetrical or symmetrical relationship, where two or more of the nuclearly bonded hydrogens of the aromatic hydrocarbon residue are substituted with Y and the hydroxyl group. Examples of dihydric phenol compounds that may be employed in this invention include 2,2-bis-(4-hydroxyphenyl)-propane or (bisphenol-A); 2,4'-dihydroxydiphenyl-methane; bis-(2 - hydroxyphenyl)-methane; bis-(4-hydroxyphenyl)-methane; bis-(4-hydroxy-5-nitrophenyl)-methane; bis-(4-hydroxy-2,6-dimethyl-3-methoxyphenyl)-methane; 1,1-bis-(4-hydroxyphenyl)-ethane; 1,2-bis-(4-hydroxyphenyl)-ethane; 1,1-bis-(4-hydroxy-2-chlorophenyl)-ethane; 1,1 - bis-(2,5-dimethyl-4-hydroxyphenyl)-ethane; 1,3-bis-(3-methyl-4-hydroxyphenyl)-propane; 2,2 - bis - (3 - phenyl-4-hydroxyphenyl)-propane; 2,2 - bis - (3 - isopropyl-4-hydroxyphenyl)-propane; 2,2-bis-(4-hydroxynaphthyl)-propane; 2,2-bis-(4-hydroxyphenyl)-pentane; 3,3 - bis-(4-hydroxyphenyl)-pentane; 2,2-bis-(4-hydroxyphenyl)-heptane; bis-(4-hydroxy-phenyl)-phenyl methane; bis - (4 - hydroxyphenyl)-cyclohexyl methane; 1,2-bis-(4-hydroxyphenyl)-1,2-bis-(phenyl) ethane; 2,2 - bis - (4-hydroxyphenyl)-1,3-bis-(phenyl) propane; 2,2 - bis - (4-hydroxyphenyl)-1-phenyl propane; and the like. Also included are dihydroxybenzenes typified by hydroquinone and resorcinol, dihydroxydiphenyls such as 4,4'- dihydroxydiphenyl; 2,2'-dihydroxydiphenyl; 2,4'-dihydroxy-diphenyl; dihydroxynaphthalenes such as 2,6-dihydroxynapthalene, etc. Dihydroxy aryl sulfones, such as those set forth in application Serial No. 613,817, filed October 4, 1956, assigned to the same assignee as this invention, are also useful, e.g., bis - (4 - hydroxyphenyl)-sulfone; 2,4'-dihydroxydiphenyl sulfone; 5'-chloro-2,4'-dihydroxydiphenyl sulfone; 5'-chloro-2',4-dihydroxydiphenyl sulfone; 3'-chloro-4, 4'-dihydroxydiphenyl sulfone; bis - (4 - hydroxyphenyl) biphenyl disulfone, etc. The preparation of these and other useful sulfones is described in Patent 2,288,282—Huissmann. Polysulfones as well as substituted sulfones using halogen, nitrogen, alkyl radicals, etc. are also useful. Dihydroxy aromatic ethers such as those set forth in application Serial No. 598,768 filed July 19, 1955, assigned to the same assignee as this invention, are also useful. Methods of preparing such materials are found in Chemical Reviews, 38, 414–417 (1946), and Patent 2,739,171—Linn. Exemplary of such dihydroxy aromatic ethers are 4,4'-dihydroxydiphenyl ether; 4,4'-dihydroxytriphenyl ether; the 4,3'-4,2'-, 3,3'-, 2,2'-2,3'-, etc. dihydroxydiphenyl ethers; 4,4'-dihydroxy - 2,5 - dimethyldiphenyl ether; 4,4'-dihydroxy-2,6-dimethyldiphenyl ether; 4,4'-dihydroxy-3,3'-di-isobutyldiphenyl ether; 4,4'-dihydroxy-3,3'-diisopropyldiphenyl ether; 4,4'-dihydroxy-3,2'-dinitrodiphenyl ether; 4,4'-dihydroxy - 3,3' - dichlorodiphenyl ether; 4,4'-dihydroxy-3,3'-difluorodiphenyl ether; 4,4'-dihydroxy-2,3'-dibromodiphenyl ether; 4,4' - dihydroxydinaphthyl ether; 4,4'-dihydroxy-3,3'-dichlorodinaphthyl ether; 2,4'-dihydroxytetraphenyl ether; 4,4'-dihydroxypentaphenyl ether; 4,4'-dihydroxy-2,6-dimethoxydiphenyl ether; 4,4'-dihydroxy-2,5-diethoxydiphenyl ether, etc. Mixtures of the dihydric phenols can also be employed and where dihydric phenol is mentioned herein, mixtures of such materials are considered to be included.

Copolymer compositions can be prepared using vacuum cook melt polymerization techniques. Employing this method high vacuum and elevated temperatures are generally required to promote complete polymerization. The reactants in this case will normally consist of (1) a dihydric phenol, (2) a carbonate ester such as diphenyl carbonate and (3) a diaryloxy or dialkoxysilane such as dimethyldiphenoxysilane. In course of the polymerization an ester exchange type of reaction occurs yielding the desired copolymer compositions plus the corresponding phenols or alcohols of condensation.

However, employing the vacuum cook method of preparing the polycarbonate-siloxy copolymers, the products in the final stages of the reaction become quite viscous and difficult to handle. I therefore prefer generally to carry out the reaction using phosgene or phosgene-like dibasic acid halide as the carbonate group precursor and dihalosilanes as siloxy group precursors in an organic basic material such as a tertiary amine (e.g., pyridine, dimethylaniline, quinoline, etc.). The base can be used undiluted or diluted with inert solvents, for example, hydrocarbons such as benzene, toluene, xylene, etc., and halocarbons such as chloroform, chlorobenzene, methylene chloride, etc. Tertiary amines are advantageous in that they serve to catalyze the reaction, are good solvents, and act as acceptors for halogen acid given off during the reaction.

Although the dihydric phenol-phosgene-dihalosilane reaction can be carried out over a wide range of temperatures, for example, from below 0° C. to over 100° C., the reaction proceeds satisfactorily at 25° C. to 50° C. Since the reaction is exothermic, the rate of phosgene and/or dihalosilane addition can be used to control the reaction temperature. Varying amounts of phosgene and dihalosilane can be used to produce copolymers of varying carbonate-siloxy compositions having different characteristics. The total quantity of phosgene plus dihalosilane must represent at least one molar equivalent based upon the dihydric phenol.

Suitable phosgene-like dibasic acid halides, in addition to phosgene, include, for example dibromo and diiodocarbonyls as well as the bishaloformates of dihydric phenols (e.g., bischloroformates of hydroquinone, bisphenol-A, etc.) or glycols (e.g., bischloroformates of ethylene glycol, neopentyl glycol, polyethylene glycol, etc.). Other carbonate precursors will occur to those skilled in the art.

Organosilanes found useful in connection with the present invention are the organodihalosilanes. Typical of such materials are the silanes containing two chlorine atoms, the remaining valences being taken up by alkyl groups, aryl groups, alkaryl, aralkyl, etc. groups. Typical of the alkyl groups are methyl, ethyl, butyl, etc. Typical of the aryl groups are phenyl, tolyl, xylyl, chlorophenyl, etc. While for best results and from the standpoint of availability and low cost, the halogen groups are preferably chlorine, the other halides—bromine, iodine, fluorine—may also be employed.

It will be seen that the copolymer compositions described by this invention can be typically represented as derived from the following structural units or groups.

(II)

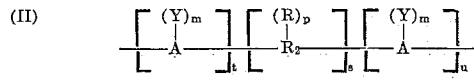

(III)

$$-O-\overset{O}{\underset{\|}{C}}-O-$$

(IV)

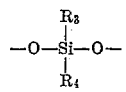

where the various letters in II have the same meaning as indicated before and where $R_3$ and $R_4$ in IV are alkyl groups, aryl groups or substituted alkyl or aryl groups.

The copolymer molecular chain may be considered as resulting from a linking together of dihydric phenol derived groups (II) by various combinations of carbonate (III) and siloxy (IV) groups.

The various materials used in the preparation of the copolymer compositions may be added in different orders to give materials of varying characteristics. For example, the dihalosilane may first be reacted with the dihydric phenol followed by the addition of phosgene to complete polymerization. Alternatively, the phosgene may be added first followed by the addition of the dihalosilane. Further modifications include the simultaneous addition of dihalosilane and phosgene to the dihydric phenol. Other variations will occur to those skilled in the art. The relative proportions of dihalosilane and dihydric phenol may be varied within wide limits. Useful materials have been obtained using from 0.01 to 0.99 mol equivalents of the dihalosilane per mol equivalent of the dihydric phenol.

The following examples are intended to be illustrative of the present invention.

EXAMPLE 1

To a reaction vessel, there was added 45.6 grams (0.20 mol) of bisphenol-A in 400 cc. of dry pyridine. To the reactor and contents, there was then added dropwise over a period of five minutes with stirring 12.5 cc. (13.2 grams; 0.10 mol; 50 mol percent) of dimethyldichlorosilane, the exothermic reaction being maintained at about 29 to 32° C. Phosgene was then bubbled into the solution at the rate of about 0.4 gram per minute to a very viscous end point. The copolymer was precipitated and washed with isopropanol in a blender. The polymer obtained had an intrinsic viscosity measured in dioxane at 30.3° C. of 0.06 and was soluble in dioxane and chloroform. The softening point of the material ranged from about 75 to 130° C.

EXAMPLE 2

Example 1 was repeated using 6.0 cc. (6.4 grams; 0.05 mol; 25 mol percent) of dimethyldichlorosilane (45.6 grams; 0.20 mol) of bisphenol-A and 400 cc. of pyridine. The intrinsic viscosity in dioxane of the resulting material was 0.30 and the softening point about 145° C. to 160° C. The tensile strength of this material was measured according to ASTM procedures at 25° C. according to ASTM test D882–49T. The cast test specimen was about 5 to 7 mils thick and ½ inch wide and was drawn at a speed of about 2" per minute using an Instron tester. The results of the tensile testing at 25° C. and at 80 and 120° C., in the latter case the testing being according to ASTM D–759–48 were as set forth in Table I below.

Table I

Tensile Strength (2"/min.)

| Temp ° C. | Yield Strength | Ultimate Strength | Elongation percent |
|---|---|---|---|
| 25 |  | 8,440 | 9 |
| 80 | 3,950 | 2,430 | 17 |
| 120 | 95 | 65 | 745 |

EXAMPLE 3

Example 1 was repeated using 0.25 cc. (0.27 gram; 0.002 mol; 10 mol percent) of dimethyldichlorosilane, 4.56 grams (0.02 mol) of bisphenol-A and 50 cc. of dry pyridine. A film cast from dichloromethane was clear, tough and strong. The intrinsic viscosity of the material measured in dioxane was 0.43 and the softening point was 120 to 160° C. as compared to about 220° C. to 230° C. for a material not containing the dimethyldichlorosilane. When measured as above, the tensile strength of this material was as set forth in Table II below.

Table II

Tensile Strength (2"/min.)

| Temp ° C. | Yield Strength | Ultimate Strength | Elongation, percent |
| --- | --- | --- | --- |
| 25 | | 9,250 | 8 |
| 80 | 6,280 | 5,050 | 9 |

EXAMPLE 4

Example 1 was repeated using 3.8 cc. (4.0 grams; 0.03 mol; 25 mol percent) dimethyldichlorosilane, 43.9 grams (0.12 mol) of tetrachloro-bisphenol-A and 400 cc. of dry pyridine. The resulting copolymer was soluble in dioxane and chloroform and the intrinsic viscosity of the material in dioxane was 0.26. The softening point of this material was from about 225° C. to 240° C. as compared to a softening point of over 280° C. for material unmodifield by the dimethyldichlorosilane.

From the above, it will be evident that the materials of the invention have many and varied applications and are useful in electrical applications and where chemical inertness is required. The materials can be used in molding powder formulations either alone or in combination with fillers such as wood flour, diatomaceous earth, silica, carbon black, etc., to make molded parts of varied shapes. They are useful for preparing gaskets, tubing and other materials which are resistant to chemicals and oil.

Films of the copolymers prepared in conventional ways are useful as wrapping or packaging materials, as metal or fiber liners, containers, covers, closures, electrical insulating tapes, sound recording tapes, pipe coverings, etc.

Films and fibers of the material can be beneficially oriented or drawn at elevated temperatures, such as from 50°–200° C. In many cases the tensile strength of the copolymers can be more than doubled by cold drawing. The fiber form of the material can be used for yarn, thread, bristles, rope, etc. and are readily dyed.

Because of their properties, the copolymers can be used as surface coverings for appliances and the like or as coatings for rods and wire, as slot insulation in dynamo-electric machines and as bonding material for parts or laminates and in adhesive formulations. They are also efficacious in wire enamels, varnishes and paints and can be readily mixed with pigments, stabilizers, plasticizers, etc. The compositions of the invention can also be alloyed with other resinous materials.

What I claim as new and desire to secure by Letters Patent of the United States is:

1. The process of preparing a copolymer composition containing dihydric phenol derived groups linked with carbonate and siloxy groups which comprises reacting together under esterification conditions a dihydric phenol, phosgene and organodihalosilane.

2. A polycarbonate copolymer of a dihydric phenol, an organosilane in which the organic group is selected from the group consisting of alkyl, aryl, alkaryl and aralkyl groups and a carbonate precursor selected from the group consisting of carbonate esters, carbonyl halides and holoformates, said polycarbonate copolymer containing both carbonate and siloxy groups in its molecular chain.

3. The copolymer of claim 2 in which the dihydric phenol is 2,2-bis-(4-hydroxyphenyl)-propane.

4. The copolymer of claim 2 in which the organosilane is dimethyldichlorosilane.

5. The copolymer of claim 2 in which the carbonate precursor is phosgene.

6. The copolymer of claim 2 in the form of electrical insulating material.

7. The copolymer of claim 2 in the form of a fiber.

8. The copolymer of claim 2 in the form of a film.

9. An electrical conductor coated with electrical insulation material comprising a polycarbonate copolymer of a dihydric phenol, an organosilane in which the organic group is selected from the group consisting of alkyl, aryl, alkaryl and aralkyl groups and a carbonate precursor selected from the group consisting of carbonate esters, carbonyl halides and haloformates, said polycarbonate copolymer containing both carbonate and siloxy groups in its molecular chain.

10. The copolymer of claim 2 in the form of a molded structure.

11. A laminated structure comprising laminae and, as an adhesive therefor, a resinous material comprising a polycarbonate copolymer of a dihydric phenol, an organosilane in which the organic group is selected from the group consisting of alkyl, aryl, alkaryl and aralkyl groups and a carbonate precursor selected from the group consisting of carbonate esters, carbonyl halides and haloformates, said polycarbonate copolymer containing both carbonate and siloxy groups in its molecular chain.

References Cited in the file of this patent

UNITED STATES PATENTS

| | | |
| --- | --- | --- |
| 2,406,549 | Lieber | Aug. 27, 1946 |
| 2,950,266 | Goldblum | Aug. 23, 1960 |